United States Patent
Thompson (10) Patent No.: US 7,080,811 B2
(45) Date of Patent: Jul. 25, 2006

(54) UTENSIL HOLDER

(76) Inventor: Charles Murray Thompson, 9756 S. County Rd. 200 W., Cloverdale, IN (US) 46120

( * ) Notice: Subject to any disclaimer, the term of this patent is extended or adjusted under 35 U.S.C. 154(b) by 0 days.

(21) Appl. No.: 10/896,622

(22) Filed: Jul. 22, 2004

(65) Prior Publication Data

US 2006/0016943 A1    Jan. 26, 2006

(51) Int. Cl.
*A45F 3/44* (2006.01)
*A47J 37/07* (2006.01)

(52) U.S. Cl. .......................... 248/156; 248/87; 126/29; 99/421 HV; 43/21.2

(58) Field of Classification Search .............. 248/156, 248/37.3, 37.6, 87, 530; 126/30, 29; 99/421 HV; 43/21.2; D22/147, 148
See application file for complete search history.

(56) References Cited

U.S. PATENT DOCUMENTS

| | | | |
|---|---|---|---|
| 965,826 A * | 7/1910 | Lynch | 248/518 |
| 1,452,640 A | 4/1923 | Hulick | |
| 1,537,237 A | 5/1925 | Kaestner | |
| 2,293,305 A * | 8/1942 | Oldham | 43/21.2 |
| 2,517,448 A * | 8/1950 | Schmeling | 99/421 A |
| 2,517,937 A | 8/1950 | Stanton | 248/533 |
| 2,519,612 A * | 8/1950 | Tuttle | 248/530 |
| 2,522,223 A | 9/1950 | Hardin et al. | |
| 2,888,220 A * | 5/1959 | Rose | 248/538 |
| 2,894,706 A * | 7/1959 | Cappio | 248/87 |
| 2,974,662 A | 3/1961 | Forrest | |
| 3,162,113 A | 12/1964 | Tallaksen | |
| 3,306,560 A * | 2/1967 | Wheeler | 248/538 |
| 3,669,390 A * | 6/1972 | Nielson | 248/514 |
| 4,065,085 A | 12/1977 | Gellatly | |
| 4,094,296 A | 6/1978 | Beagley | |
| 4,230,089 A | 10/1980 | Barden | |
| 4,269,164 A | 5/1981 | Van Grinsven et al. | |
| D260,114 S * | 8/1981 | Cecchetti | D22/147 |
| 4,351,312 A | 9/1982 | Ivy | |
| 4,517,885 A * | 5/1985 | Thompson | 99/421 HV |
| 4,553,525 A | 11/1985 | Ruble | |
| 4,607,608 A | 8/1986 | Allred et al. | |
| 4,829,977 A | 5/1989 | Valentine | |
| 4,856,423 A | 8/1989 | Burns | |
| 4,866,873 A * | 9/1989 | Van Valkenburg | 43/21.2 |
| D306,681 S * | 3/1990 | Toca, III | D8/1 |
| 4,938,446 A * | 7/1990 | Williams | 248/530 |
| 4,979,490 A | 12/1990 | Nudo et al. | |
| D315,012 S * | 2/1991 | Koga | D22/147 |
| D344,321 S * | 2/1994 | DeWitt | D22/148 |
| D345,409 S * | 3/1994 | Baynard | D22/147 |
| 5,307,797 A | 5/1994 | Kleefeld | |

(Continued)

*Primary Examiner*—Anita M. King
(74) *Attorney, Agent, or Firm*—Woodard, Emhardt, Moriarty, McNett & Henry LLP (57) ABSTRACT

A utensil holder is designed for easy holding and removal of an utensil to be supported therein. The utensil holder in one embodiment is a continuous rod that includes a carriage having a first configured arrangement and a second configured arrangement. The configured arrangements form an inverted wedge and a U-shaped portion respectively. In some embodiments, the inverted wedge defines an inverted V-shaped opening. The inverted V-shaped opening wedges the handle of a utensil and the U-shaped portion supports the utensil in a cantilevered position. In an alternate embodiment, an extended portion can hold a wider utensil while an inverted wedge in another plane can hold an utensil having a cylindrical handle. The utensil holder in some embodiments is designed to hold utensils for cooking food over campfires.

7 Claims, 5 Drawing Sheets

U.S. PATENT DOCUMENTS

| | | |
|---|---|---|
| 5,355,867 A | 10/1994 | Hall et al. |
| 5,557,877 A * | 9/1996 | Colson .................. 43/21.2 |
| 5,666,940 A | 9/1997 | Kreiter |
| 5,819,718 A | 10/1998 | Leiser |
| 5,848,584 A | 12/1998 | Brog |
| 5,862,742 A | 1/1999 | Bjerg |
| 5,944,009 A | 8/1999 | Scheller |
| 6,029,646 A | 2/2000 | Jackson |
| 6,234,162 B1 | 5/2001 | Wenker |
| 6,487,813 B1 * | 12/2002 | Baynard et al. ............ 43/21.2 |
| D471,952 S * | 3/2003 | Cardenas .................. D22/147 |
| 6,640,797 B1 | 11/2003 | Magers |

* cited by examiner

UTENSIL HOLDER

TECHNICAL FIELD

The present invention generally relates to outdoor equipment, more particularly, but not exclusively, to a device for holding various utensils.

BACKGROUND

Human beings have been cooking over campfires for eons. In the typical campfire situation, a hot dog, marshmallow, or other food item is placed on a stick and held over a fire until it is cooked to a desired temperature and crispness. This method of cooking is generally not very effective. For example, the person holding the stick may have to stand too close to the fire and can possibly get burned. Also, the person cooking the food has to hold the stick in their hand, but they may prefer to be doing other activities at that time. In addition, uneven cooking of the food may occur.

A variety of devices have been created to improve cooking over a campfire. For instance, U.S. Pat. No. 2,522,223 to C. N. Hardin et al. (the "Hardin" reference) teaches a barbecue and campfire cooking apparatus support. In the Hardin reference, a slide C is adjustably mounted upon the upper portion of a standard A for supporting a cooking implement D of any desired kind. The slide comprises a relatively short section of a heavy wire formed into a coil 11 the inner diameter of which is sufficient size to loosely but closely engage over and normally slide lengthwise on the standard. One arm 12 of the slide C is formed with a downwardly directed hook or loop 13 and the opposite arm 14 is formed with a upwardly directed hook or loop 15. The arm 14 is preferably longer than the arm 12 to augment tilting tendency of the slide. The loops 13 and 15 are directed transversely and relative alignment to each other on one side of the coil which grips the standard to provide clearance on one side of the standard for the handle rod or shank of a suitable implement D.

In addition, U.S. Pat. No. 5,944,009 to Scheller et al. (hereinafter the "Scheller" reference) teaches a portable outdoor grill. The Scheller device is a portable grill which permits adjustment of a food support platform in three dimensions. A ground support accepts a trussed stanchion and permits rotation of the stanchion. The ground support can be a tubular ground stake or may comprise a support stand. A swing arm is reciprocally mounted to the stanchion and supports one or more couplers having support hooks, a chain and an "S" hook. A harness is suspended from the S hook and secured to a cooking platform.

U.S. Pat. No. 1,537,237 to J. D. Kaestner is for a nozzle holder (hereinafter the "Kaestner" reference). The invention is formed from a single rod and includes a standard 6, the upper end portion which is bent to form two independent nozzle-holding clips 7 and 8, the former of which is located close to the standard 6 and in substantially the same vertical plane therewith. The latter of which is located outward of the clip 7 and extends substantially in a horizontal plane. The clips 7 and 8 are U-shaped and the prongs thereof are in converging relation, and either of said clips is adapted to receive the coupling 12 on the outer end of a garden hose 13.

The present invention differs from the Kaestner, Hardin and Scheller references.

SUMMARY

One aspect of the invention is a campfire utensil holder. The campfire utensil holder is made of a continuous rod with a lower end for insertion into the soil, and defining a generally inverted V-shaped opening and a generally non-inverted generally U-shaped portion near its upper end spaced approximately laterally therefrom when the lower end of the rod is vertically oriented in the ground.

Other aspects of the invention include a holder suitable for a utensil having a handle on a shaft. The holder includes a rod suitable for insertion into the ground; a downwardly facing wedge opening in which the sides of the opening narrow with height, sized appropriately for a utensil handle; and an upwardly facing surface spaced laterally from the downwardly facing wedge opening to permit the generally radial placement of the utensil with its handle wedged in the wedge opening and its shaft adjacent the upwardly facing surface.

Yet another aspect of the invention is a device for supporting a utensil having a handle. The device includes an elongate member for insertion into a receiving area; and a carriage attached to said elongate member near its top, said carriage having a downwardly facing utensil handle engaging portion and an upwardly facing utensil engaging portion spaced generally laterally therefrom to permit the cantilevered positioning of a utensil there between with its handle engaging the downwardly facing utensil handle engaging portion, wherein the downwardly facing utensil engaging portion is constructed and arranged to prevent rotation of the utensil when the cooking member is placed in a cantilevered position therein.

Yet a further aspect of the invention is a device. The device includes a continuous rod for insertion into a receiving area; a straight portion of the rod at one end of the rod; a first configured arrangement near the other end of the rod with at least three bends, two of which are in different planes; a second configured arrangement with at least two bends in different planes closer to the other end of the rod; and a generally lateral portion of the rod joining the two configured arrangements.

A further aspect of the invention is a method for supporting an elongate cooking utensil in which one end functions as a handle, using a utensil holder having both a supporting surface and an inverted wedge spaced apart therefrom less than half the length of the elongate utensil, with the inverted wedge having an open space to allow the elongate utensil to be moved toward the wedge with radial movement. The method includes the steps of inserting the utensil holder into a receptive area; placing the cooking utensil adjacent and above the supporting surface; and placing the handle of the utensil into the inverted wedge from below the inverted wedge so that the center of gravity of the utensil and any items thereon is located beyond the space between the supporting surface and the inverted wedge and closer to the supporting surface, whereby the downward force at the center of gravity places an upward force of the handle against the wedge, with the supporting surface being a fulcrum.

A method for supporting an elongate cooking utensil in which one end functions as a handle, using a utensil holder having a rod like portion for inserting into a receptive area and having an upwardly facing supporting surface and a downwardly facing surface spaced apart therefrom less than half the length of the elongate utensil, with the two surfaces each having a fixed distance from the lower end of the utensil holder, and with the downwardly facing surface having a open space to allow the elongate utensil to be radially moved to engage the downwardly facing surface and with the upwardly facing supporting surface having an open space to allow the elongate utensil to be radially moved to engage the upwardly facing supporting surfaces. The method includes the steps of inserting the utensil holder into a receptive area with the rod like portion approximately vertical; placing the utensil adjacent and above the supporting surface substantially adjacent a line through the axis of the rod like portion; and moving the handle of the utensil upwardly against the downwardly facing surface from below the downwardly facing surface, so that the center of gravity of the utensil and any items thereon is located beyond the space between the upwardly facing surface and the downwardly facing surface and closer to the upwardly facing surface, whereby the downward force at the center of gravity places an upward force of the handle against the downwardly facing surface, with the upwardly facing surface being a fulcrum.

DETAILED DESCRIPTION OF THE SELECTED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and such further applications of the principles of the invention as illustrated therein being contemplated as would normally occur to one skilled in the art to which the invention relates.

Figures 1, 2:
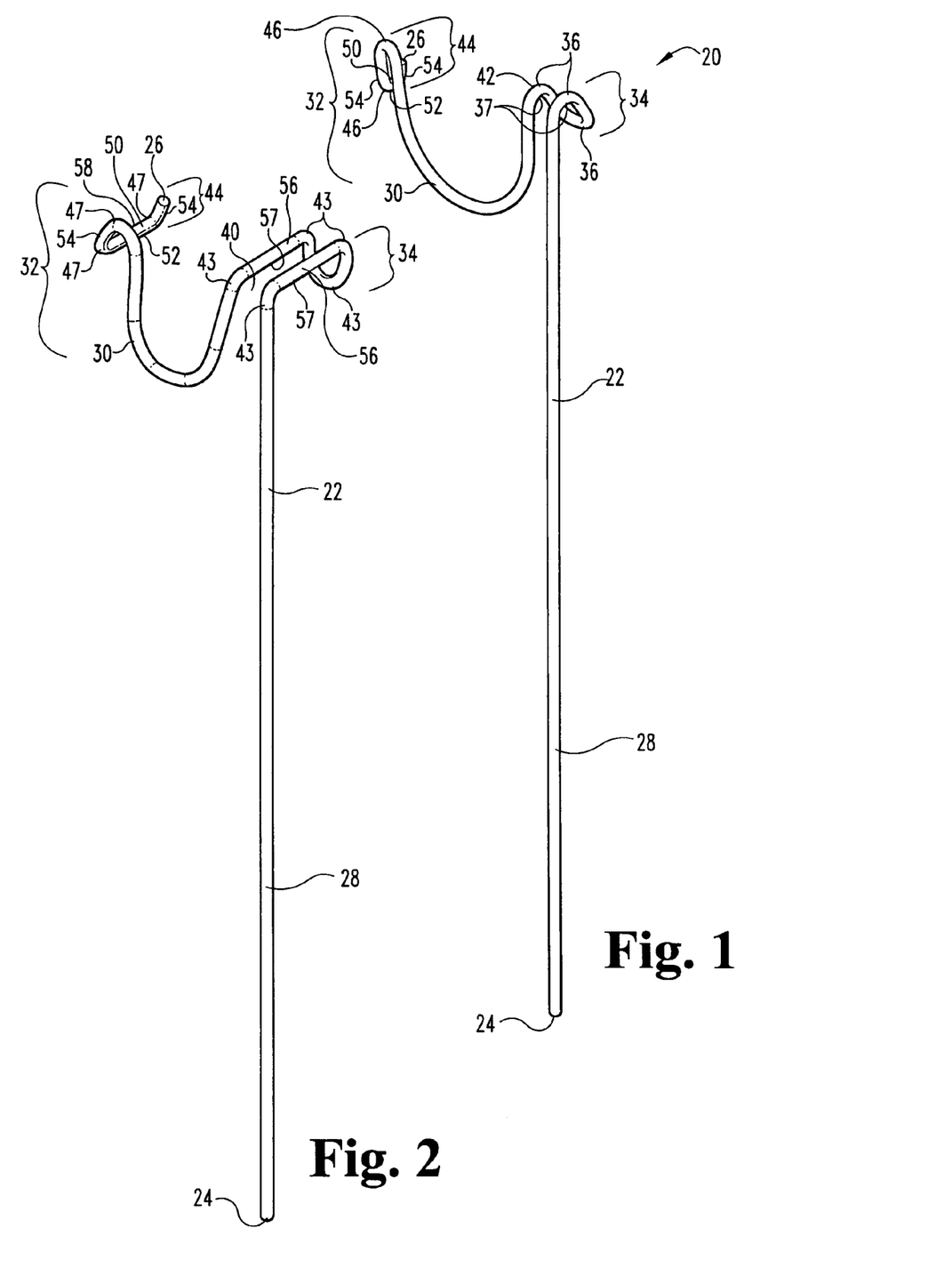
FIG. 1 illustrates a perspective view of one embodiment of an utensil holder according to the present invention.
FIG. 2 illustrates an alternative embodiment of an utensil holder.

Referring now to the drawings, FIG. 1 and FIG. 2 illustrate a utensil holder 20 according to some embodiments. The utensil holder 20 in the embodiments illustrated in FIG. 1 and FIG. 2 are elongate members 22. In the illustrated embodiments, the elongate members 22 are continuous rods. It is contemplated, however, that alternate embodiments of the invention are not formed of a continuous rod or an elongate member. They are formed of separate members. Moreover, alternate embodiments have other configurations readily apparent to those skilled in the art. It is important to remember that the claims define the scope of the invention.

The elongate members 22 of the illustrated embodiments have a rounded cross section. Alternate embodiments have cross sections that are square, triangular, hexagonal, octagonal or any other cross section that is readily apparent to one skilled in the art. The elongate members 22 have lower ends 24 and upper ends 26. The lower ends 24 and the upper ends 26 of the illustrated embodiments are connected together by a straight portion 28 and a lateral portion 30. In the illustrated embodiments, the lateral portion 30 is a U-shaped connection member. It is contemplated, that the lateral portion 30 in other embodiments define different shapes, such as a straight across lateral portion 30. The straight portion 28 facilitates insertion of the utensil holder 20 into a receptive area, such as the ground.

At the top of the utensil holder 20 there is a carriage 32. The carriage 32 is constructed and arranged to be able to hold a utensil. In the illustrated embodiments of FIG. 1 and FIG. 2, the carriage 32 consists of a first configured arrangement 34 and a second configured arrangement 44. In the embodiment illustrated in FIG. 1, the first configured arrangement 34 forms an inverted wedge that defines an inverted V-shaped opening. Other embodiments define other shaped openings, such as a wedge shape or a W-shaped opening. The inverted wedge is formed from the first configured arrangement 34 using three bends 36, two of which are in different planes. The embodiment of FIG. 1 defines an inverted V-shaped opening because the bends 36 define the V-shaped opening to be wide at the bottom and narrow as it goes towards the apex 42 of the wedge. The inverted V-shaped opening includes a downwardly facing surface 37 for engagement with the utensil. The downwardly facing surface 37 is accessed by the utensil through the open space existing below the inverted V-shaped opening.

Referring now to the embodiment illustrated in FIG. 2, the inverted wedge of the first configured arrangement 34 is defined in a different plane than the wedge of the embodiment illustrated in FIG. 1. The inverted wedge doesn't have an apex 42 but a gap 40 at the point. The remainder of the first configured arrangement 34 of FIG. 2 is defined by five small bends 43. The inverted wedge forms a V-shaped opening that is able to receive a handle of a utensil and restrict its motion by wedging the handle into the opening. In addition, once the handle is removed, it could be easily moved around or rotated before it is placed back into the inverted wedge.

FIGS. 1 and 2 illustrate that the lateral portion 30 connects the first configured arrangement 34 to the second configured arrangement 44. The second configured arrangement 44 in the FIG. 1 embodiment includes two bends 46. The embodiment illustrated in FIG. 2 has three small bends 47. These bends 46, 47 help define a U-shaped portion for the second configured arrangement 44. The U-shaped portion has a top surface 50 where a surface of the utensil that is to be held by the utensil holder 20 will rest. The top surface 50 is an upwardly facing supporting surface that engages the utensil during use of the utensil holder 20. The U-shaped portion also has a bottom surface 52. In the embodiment illustrated in FIG. 1, the top surface 50 is lower than the apex 42 of the first configured arrangement 34. There are also restraints 54 on either side of the top surface 50. The top surface 50 and the restraints 54 are used to help hold the utensil steady. It is contemplated, however, that alternate embodiments do not use the first or second configured arrangements 34, 44 and have a design that is different than the illustrated embodiments.

Figure 5:
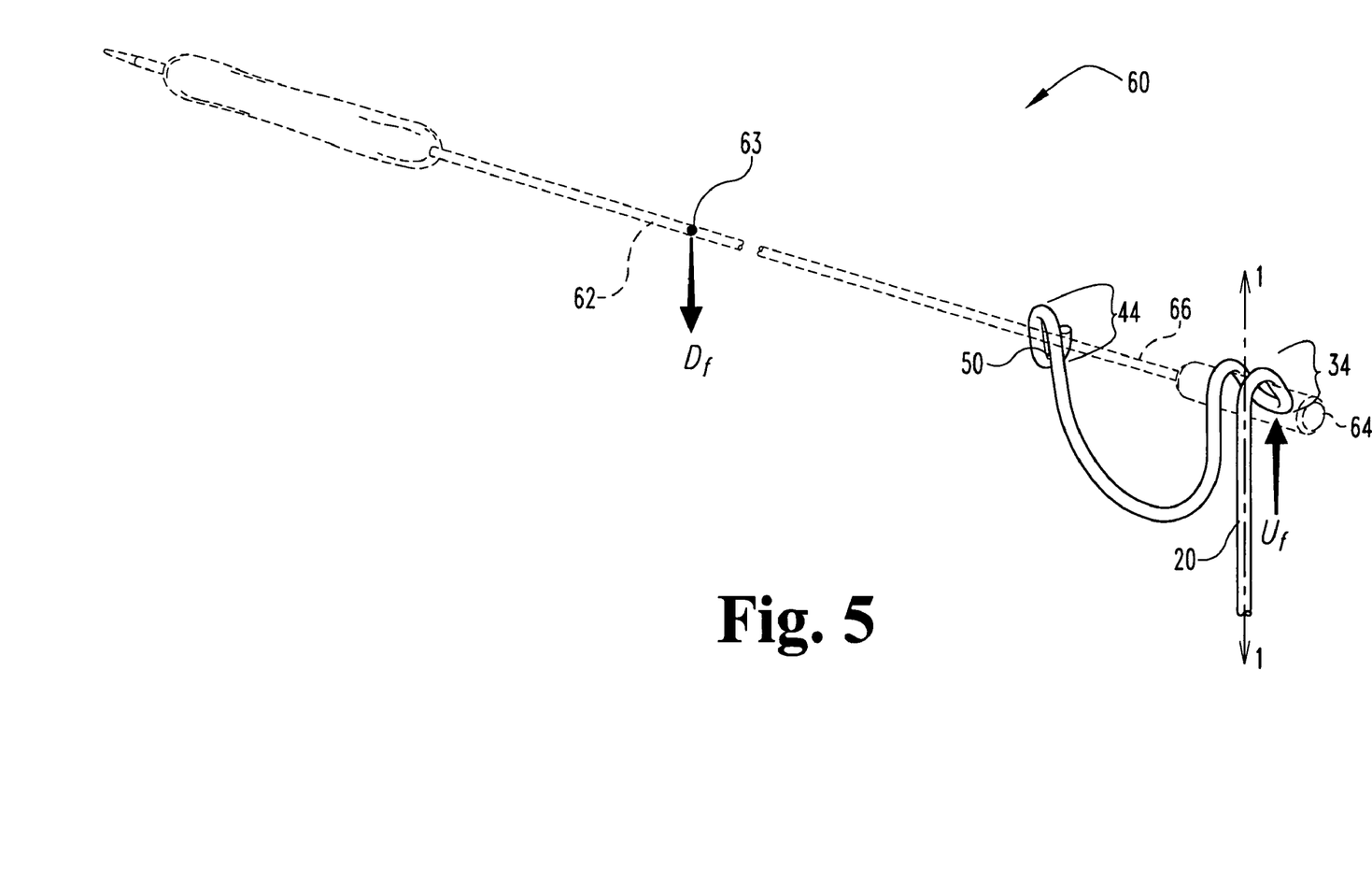
FIG. 5 illustrates a perspective view of the carriage section of the embodiment illustrated in FIG. 1 holding a cooking utensil.
Figure 6:
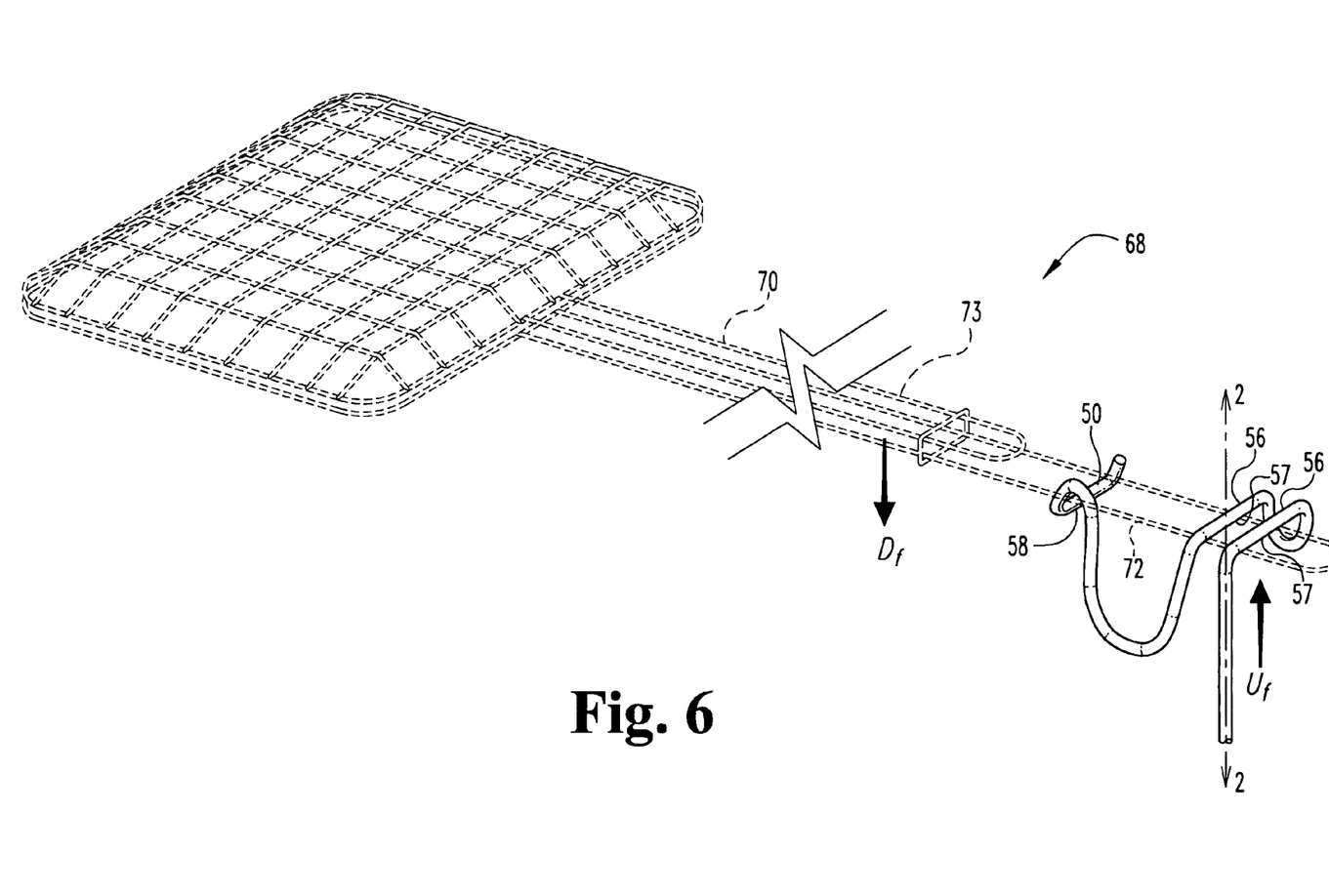
FIG. 6 illustrates a perspective view of the carriage section of the embodiment illustrated in FIG. 2 holding a cooking utensil.

Referring now to FIG. 2, the alternate embodiment is generally the same as the embodiment in FIG. 1. There is, however, a first extended portion 56 and a second extended portion 58 which creates wider, flatter downwardly facing surfaces 57 and top surface 50. The extended portions 56 and 58 can hold a larger, wider handle for different types of utensils that the embodiment illustrated in FIG. 1 would not be able to accommodate. In addition, the U-shaped lateral portion 30 is sized different. Reference to FIGS. 5 and 6 further illustrates the differences between the embodiments.

Figure 3:
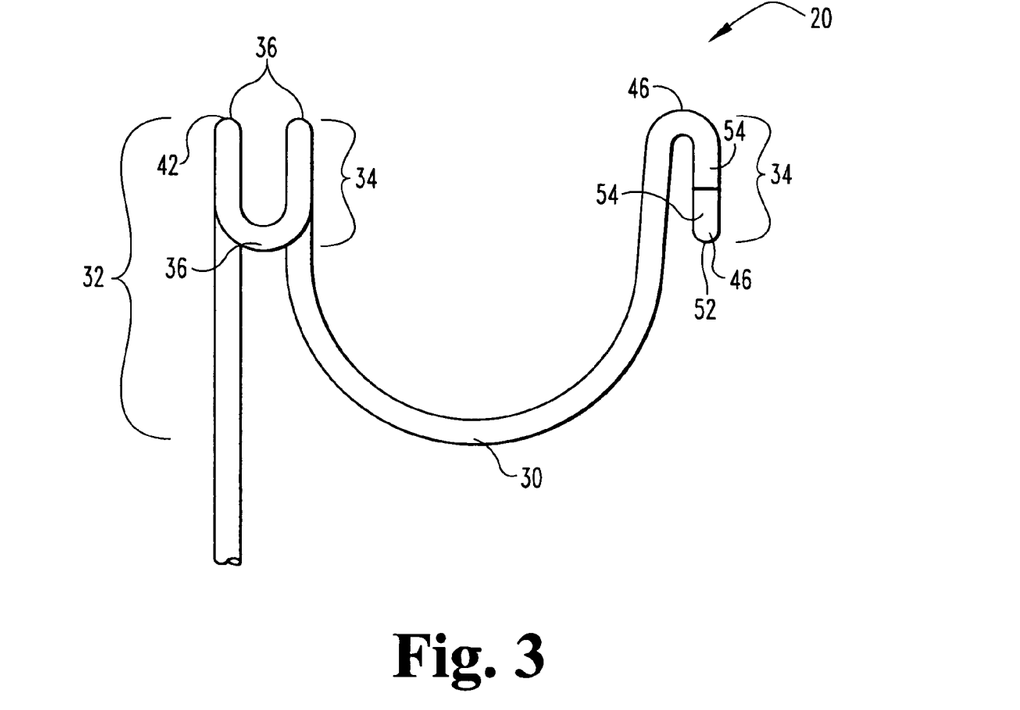
FIG. 3 illustrates a side view of the carriage of the embodiment illustrated in FIG. 1.
Figure 4:
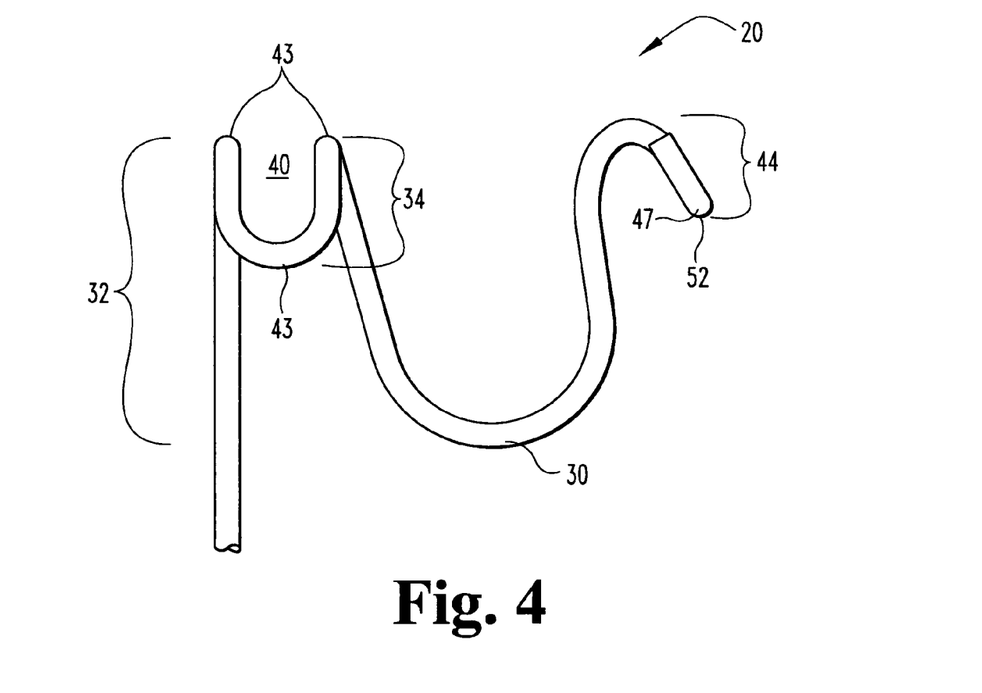
FIG. 4 illustrates a side view of the carriage of the embodiment illustrated in FIG. 2.

FIGS. 3 and 4 illustrate the carriage 32 of the utensil holders 20. As indicated previously, the lateral portion 30 does not have to be U-shaped as illustrated in FIG. 3 or 4. They can take on a variety of different shapes while still being within the scope of the claims. The view of FIG. 3 illustrates that the apex 42 of the first configured arrangement 34 is higher than the top surface 50 of the second configured arrangement 44 and that the bends 36, 43, 46, and 47 are in different planes. This ensures that handle and the rod in the utensil is properly in line and a cantilevered position is created. FIG. 4 illustrates the carriage 32 of FIG. 2. Again, like the embodiment in FIG. 3, the top surface of the second configured arrangement 44 is lower than the gap 40 of the V-shape. This ensures a cantilevered positioning of the utensil. A cantilevered position makes sure that the utensil is properly wedged in place.

Now referring to FIG. 5, an assembly 60 has the holder 20 holding a utensil 62. The utensil 62 of the illustrated embodiment is a hot dog stick. It is contemplated, however, that a variety of utensils are utilized in alternate embodiments. In some embodiments, the utensils are elongate cooking utensils, such as the illustrated hot dog stick. It is to be appreciated, however, that the utensils are not limited to cooking utensils. FIG. 5 illustrates that line 1—1 runs through the straight portion 28 and intersects one side of the V-shaped opening defined by the first configured arrangement 34. Thus, the downwardly facing surfaces of the inverted wedge formed by the first configured arrangement 34 and top surface 50 are substantially adjacent to line 1—1. The utensil 62 has a handle 64 that wedges in the first configured arrangement 34. It also has a rod 66 which is supported by the top surface 50 of the second configured arrangement 44. FIG. 5 illustrates that the center of gravity 63 of the utensil 62 is located beyond the space between the top surface 50 and the inverted wedge shaped or V-shaped opening and closer to the top surface 50. The downward force $D_f$ at the center of gravity 63 places an upward force $U_f$ of the handle 64 against the inverted wedge formed by the first configured arrangement 34. The top surface 50 acts as a fulcrum. This insures that the utensil 62 is cantilevered so that it is firmly fixed into place. In addition, the handle 64 is easily removed by unwedging it from the first configured arrangement 34 and it can be rotated simply and easily over the top surface 50 of the second configured arrangement 44.

Referring now to FIG. 6, the embodiment illustrated in FIG. 2 is depicted supporting a utensil 70. The assembly 68 includes a utensil 70 having a handle 72. The utensil 70 of the illustrated embodiment is a hamburger basket. As illustrated the handle 72 of the utensil 70 is wider and flatter requiring the extended portions 56, 58 for support. FIG. 6 illustrates that line 2—2 also runs substantially adjacent to a downwardly facing surface 57 of the extended portions 56, 58. The utensil 70 therefore is firmly held into place by the cantilevered positioning. In addition, the utensil 62 illustrated in FIG. 5 can be placed in the first configured arrangement 34 along a perpendicular axis to the axis utensil 20 is placed. Therefore, the FIG. 2 embodiment can hold multiple utensils in different directions. The embodiment can hold the utensil 62 illustrated in FIG. 5 by wedging the handle 64 in the inverted V-shaped opening or it can hold utensil 70 along within the flat extended portions 56, 58.

Figure 7:
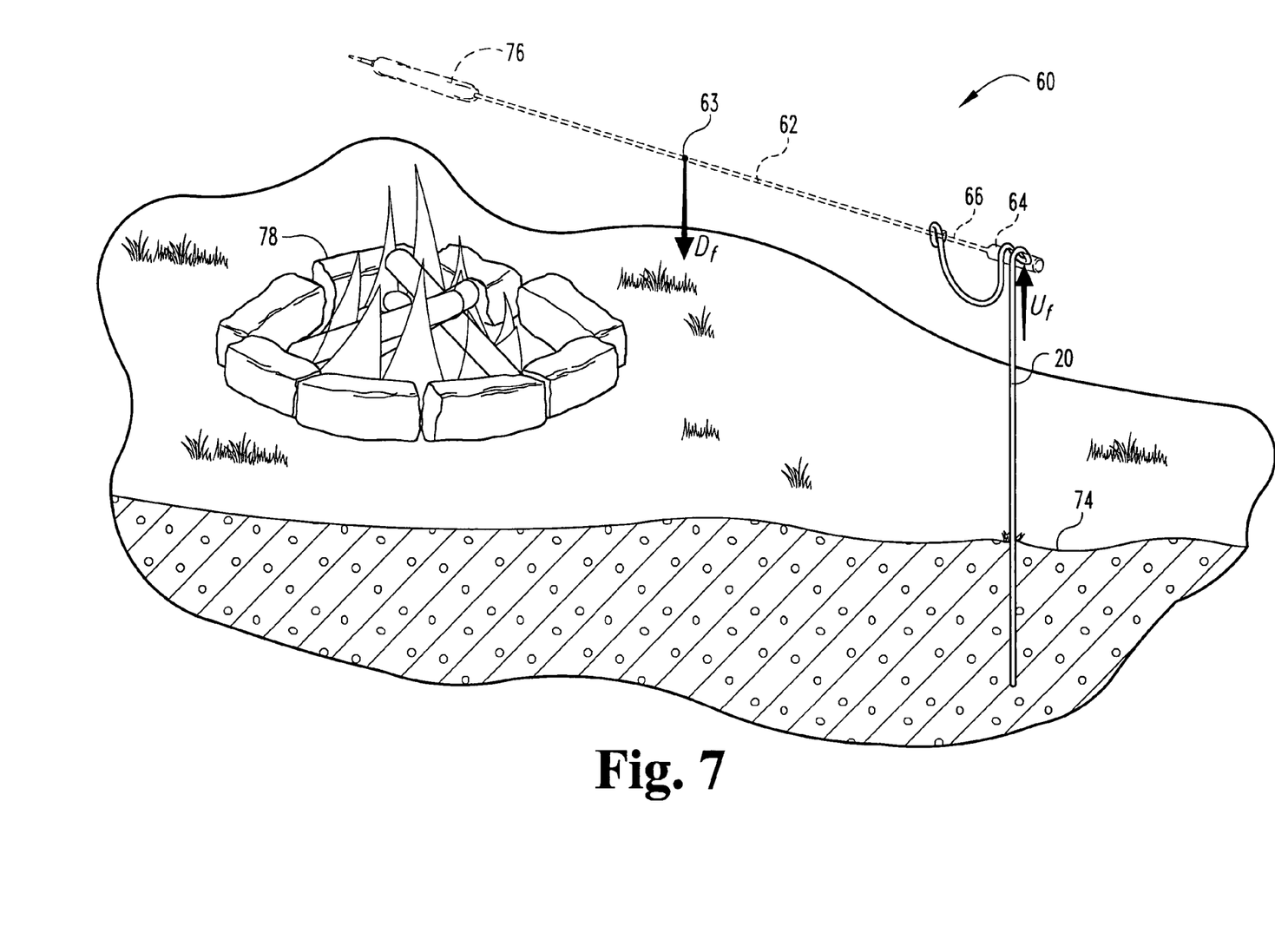
FIG. 7 illustrates the embodiment of FIG. 1 inserted into the ground and holding a cooking utensil over a campfire.

Referring now to FIG. 7, the assembly 60 illustrated in FIG. 5 is depicted inserted into the ground 74 and cooking some food 76 over a fire 78. As discussed earlier, the first configured arrangement 34 wedges the handle 64 of the utensil 62. Therefore, the user can have the food cooked over a fire at a safe distance and attend to other things at the same time. In addition, the handle 64 can be easily removed from the first configuration 34 and the food can be rotated to insure adequate cooking all around. The rod 66 of the utensil 62 rotates easily in the second configured arrangement 44, thereby providing a rotisserie effect.

FIG. 7 illustrates that the invention can be used to support a utensil 62 that is an elongate cooking utensil, such as a hot dog holder, in which one end functions as a handle 64. More particularly, it has a utensil holder 20 having both a supporting surface such as top surface 50, and an inverted wedge formed by the first configured arrangement 34 spaced apart therefrom less than half the length of the elongate cooking utensil. The inverted wedge engages the handle at two points, as is characteristic of a wedge, with the inverted wedge having an open space to allow the elongate utensil to be moved toward the wedge with radial movement. In other words, the elongate cooking utensil does not have to be inserted by movement aligned with its axis.

In use, the utensil holder 20 is inserted into the ground 74 or other suitable receptive area, such as a patio deck, or other suitable base. In some embodiments, the utensil holder 20 is pushed into the ground close to a campfire as illustrated in FIG. 7. The cooking utensil 62 is then placed adjacent and above the supporting surface, and the handle 64 of the utensil 62 is placed into the inverted wedge from below the inverted wedge, so that the center of gravity 63 of the utensil and any items 76 thereon is located beyond the space between the supporting surface and the inverted wedge and closer to the supporting surface. When this is done, the downward force $D_f$ at the center of gravity 63 places an upward force $U_f$ of the handle 64 against the wedge, with the supporting surface being a fulcrum. The utensil 62 then can be extended over a campfire as illustrated in FIG. 7.

It is contemplated that the embodiment illustrated in FIG. 2 and FIG. 6 can have a similar use. The utensil holder 20 of FIG. 2 supports an elongate cooking utensil 70, such as the hamburger basket, in which one end functions as a handle 72. The utensil holder 20 has a rod-like portion 28 for inserting into a receptive area 74. The holder 20 has an upwardly facing supporting surface and downwardly facing surface spaced apart therefrom less than half the length of the elongate utensil 70. The two surfaces are positioned a fixed distance from the lower end of the holder 20. The downwardly facing surface has an open space to allow the elongate utensil 70 to be radially moved to engage the downwardly facing surface. The upwardly facing surface has an open space to allow the elongate utensil 70 to be radially moved to engage said upwardly facing supporting surfaces. In other words, the utensil 70 does not have to be moved axially to engage the upward facing and downward facing surfaces.

In use, the utensil holder 20 is inserted into a receptive area, such as the ground 74, with the rod like portion 28 approximately vertical. The utensil 70 is placed adjacent and above said supporting surface. As illustrated in FIG. 6, the supporting surface is substantially adjacent a line through the axis of the rod like portion 28. This is illustrated in FIG. 6 as top surface 50 and line 2—2. The handle 72 of the utensil 70 is then moved upwardly against the downwardly facing surface from below the downwardly facing surface. The center of gravity 73 of the utensil 70 and any items 76 thereon is then located beyond the space between the upwardly facing surface and the downwardly facing surface and closer to the upwardly facing surface. When this is done, the downward force $D_f$ at the center of gravity 73 places an upward force $U_f$ of the handle 72 against the wedge, with the supporting surface being a fulcrum.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected. For example, while the holder is shown for use with a campfire and utensil, a device incorporating the spirit of the invention of some of the claims set forth below could also be used to hold a fishing pole at the side of a stream, with the fishing pole cantilevered over the stream from a device comparable to that shown in the drawings.

What is claimed is:

1. A device comprising:
    a) a continuous rod for insertion into a receiving area;
    b) a straight portion at one end of said rod;
    c) a first configured arrangement near the other end of said rod with at least three bends, two of which are in different planes;
    d) a second configured arrangement with at least three bends each in different planes closer to the straight portion of said rod; and
    e) a generally lateral portion of said rod joining said two configured arrangements in which said first configured arrangement has five small bends and forms an inverted V-shaped opening, said V-shaped opening has a gap at the point of the V-shape.

2. The device of claim 1 in which said second configured arrangement forms an upwardly facing U.

3. The device of claim 1 in which said configured arrangements are arranged on one side of said rod.

4. A device comprising:
    a) a continuous rod for insertion into a receiving area;
    b) a straight portion at one end of said rod;
    c) a first configured arrangement near the other end of said rod with at least three bends forming a downwardly facing share, at least two of which are in different planes;
    d) a second configured arrangement forming an upwardly facing U with at least two bends in different planes and
    e) a generally lateral portion of said rod joining said two configured arrangements on the same side of:
    said downwardly facing shape,
    said upwardly facing U, and
    the location on said first configured arrangement that transitions to the rod that extends
    on toward said straight portion, thereby facilitating utensil access from one side for both said downwardly facing shape and said upwardly facing U.

5. The device of claim 4 in which said configured arrangements are arranged on one side of said rod.

6. The device of claim 4 in which said downwardly facing shape is a V shape.

7. The device of claim 4 in which said lateral portion is generally formed as an upwardly facing U shape.

* * * * *